Figure 1:
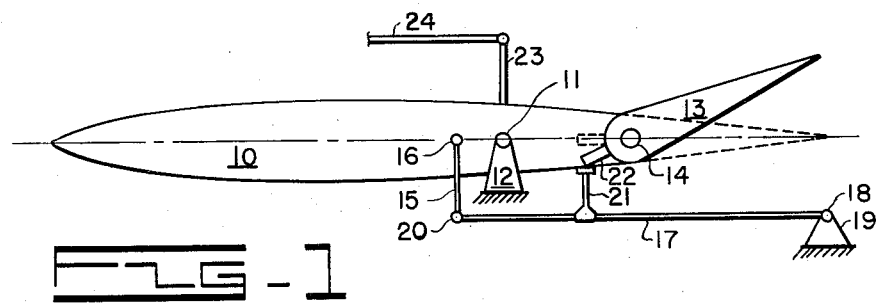

June 23, 1964      J. E. STEINER      3,138,353
METHOD AND APPARATUS FOR PREVENTING COMPLETE STALLS
OF AN AIRCRAFT AT SLOW SPEEDS
Filed March 21, 1962

NOSE HEAVY AIRCRAFT

TAIL HEAVY AIRCRAFT

*INVENTOR.*
JOHN E. STEINER
BY
*Theron N. Nichols*
AGENT

United States Patent Office 3,138,353
Patented June 23, 1964

3,138,353
METHOD AND APPARATUS FOR PREVENTING COMPLETE STALLS OF AN AIRCRAFT AT SLOW SPEEDS
John E. Steiner, Bellevue, Wash., assignor to The Boeing Company, Seattle, Wash., a corporation of Delaware
Filed Mar. 21, 1962, Ser. No. 181,297
7 Claims. (Cl. 244—87)

This invention pertains to a method and at least one mechanism for preventing an aircraft from getting too deep into a stall or to prevent complete stall of all of the wing at slow speeds.

More particularly, the disclosed invention comprises a method for preventing complete stalls and one mechanism including a variable elevator stop means or linkage connected between the stabilizer and fixed structure of the aircraft for limiting full upward movement of the elevator of an aircraft only when the aircraft is in a tail heavy condition relative to a nose heavy condition and flying at slow speed, as during landings.

The airplane stall problem during landings has been a bothersome design condition for a number of years. Past airplanes have had a variety of problems, a principal one being the aircraft getting so deep into the stall region as to be totally outside any operational condition for the aircraft. Such excursions can be avoided by limiting the maximum up elevator angle. However, in past aircraft such limitation, if it were correct for a nose heavy or forward center of gravity condition, would result in an elevator angle capable of producing excessive and detrimental wing stall at the tail heavy or aft center of gravity position. Conversely, if the elevator limitation were correct for the aft center of gravity position, then inadequate elevator movement would be available under a forward center of gravity position.

Additionally, in aircraft of the type having an air breathing engine mounted aft of the wing leading edge and above the plane of the chord thereof, a fully stalled wing is detrimental to such an engine, causing the engine to surge, run erratic, if not actually stalling altogether.

Likewise when an aircraft is approaching the ground for stall type of landings, the angle of attack is gradually increased and the airspeed is gradually decreased until a portion of the wing stalls and the aircraft settles to the ground. The instant the wing stalls the aircraft should be as close to the ground as possible. The aircraft wing is usually designed such that the various portions thereof stall at different angles of attack for a particular airspeed by varying the aerodynamic shape or varying the angle of incidence of the various wing portions as by incorporating a wash-in, a wash-out, a taper, etc., in the wing. Thus immediately upon the stalling of a portion of the wing and subsequent loss of lift, the aircraft settles to the ground. In aircraft making a landing approach at the designed approach speed of a few knots above stalling speed and with its center of gravity at the designed position or at a forward position and in a nose heavy condition, gentle rearward movement of the aircraft pitch control column to full back position raising the elevator to full upward position increases the angle of attack of the wing sufficiently to stall a portion of the wing with the resultant settling of the aircraft to the ground. However, upon actuating the same pitch control column to full back position raising the elevator to the same full upward position when the same aircraft is tail heavy and thereby already flying close to the stalling angle, the aircraft is rotated to an excessive angle of attack whereby all portions of the wing stall, a complete stall results, and the aircraft drops, instead of merely settling to the ground, often with detrimental results. The aircraft, with a completely stalled wing is described as being deep into the stall.

Accordingly, a primary object of this invention is to provide a method for preventing complete stall of a slow flying or landing aircraft with an aft positioned center of gravity.

Another primary object of this invention is to provide an elevator mechanism that will permit full movement of the elevator when it is needed for landing a nose heavy aircraft, yet will limit upward movement of the elevator when the aircraft is in tail heavy condition for prevention of the aircraft from getting too deep into the stall region, particularly at slow speeds, as during landings.

Another primary object of this invention is to provide a method and at least one apparatus for carrying out the method of preventing complete stall of an aircraft wing mounted forward and below an air breathing engine or the air intake thereof in order to obviate subsequent surge and stall of the engine.

Another object of this invention is to provide an elevator having limiting or stop means responsive to the position of the aircraft center of gravity for limiting upward movement of the elevator at slow speeds as during landings of only a tail heavy aircraft.

An additional object of this invention is to provide an elevator having limiting means responsive to the position of the stabilizer for limiting upward movement of the elevator during slow speeds and only when the aircraft is tail heavy.

A further object of this invention is to provide an elevator having limiting means responsive to pilot operated pitch trim control means for limiting upward movement of the elevator of a tail heavy aircraft, at only slow speeds as during landings.

A still further object of this invention is to provide an elevator having limiting means comprising a linkage connected between the horizontal stabilizer and fixed structure on the aircraft for limiting upward movement of the elevator at slow speeds as during landings of only a tail heavy aircraft.

Another object of this invention is to provide an elevator having limiting means comprising a linkage connected between the horizontal stabilizer and fixed aircraft structure so that with the stabilizer in down position to trim a nose heavy aircraft the linkage is responsive to the nose heavy attitude of the aircraft and permits, as required, unlimited movement of the elevator as for landings, yet with the stabilizer in up position to trim for a tail heavy aircraft the linkage is responsive to the tail heavy attitude of the aircraft to limit upward movement of the elevator.

Other objects and various advantages of the disclosed aircraft elevator with complete stall preventing means will be apparent from the following detailed description, together with the accompanying drawings, submitted for purposes of illustration only and not intended to define the scope of the invention, reference being had for that purpose to the subjoined claims.

Briefly the disclosed invention comprises a method and at least one apparatus for preventing complete stall of a slow flying aircraft. An exemplary apparatus comprises an elevator pivotally mounted on a horizontal stabilizer which in turn is adjusted by the pilot or a suitable mechanism with changes of the position of the center of gravity for maintaining the aircraft trimmed in pitch. Linkage is connected between the stabilizer and fixed structure of the aircraft for supporting a moveable stop and responsive to the stabilizer position for permitting full upward elevator movement when the aircraft is nose heavy, yet limiting the detrimental full upward elevator movement when the aircraft is tail heavy.

Figure 2:
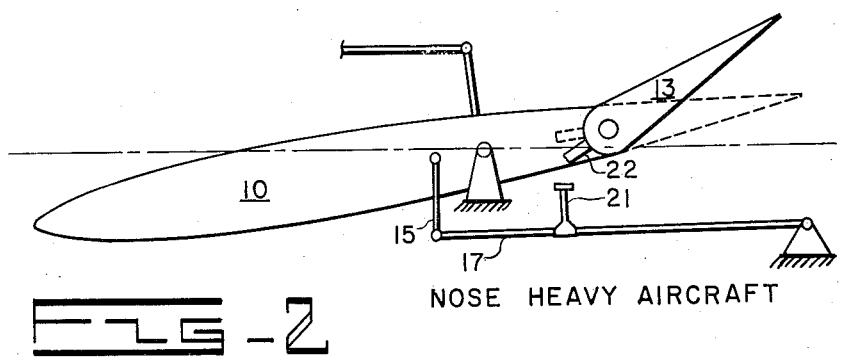
Figure 3:
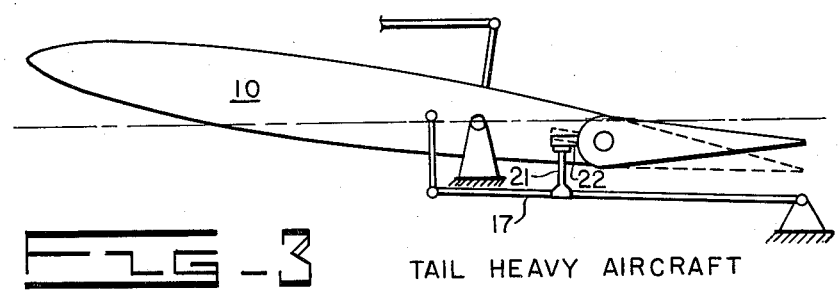

The drawing diagrammatically illustrates by way of example, not by way of limitation, one form of the invention wherein like reference numerals designate corresponding parts in the several views in which:

FIG. 1 is a schematic view, with parts in section, of the invention showing the position of the aircraft horizontal stabilizer and elevator limiting means when the aircraft center of gravity is at its normal or designed position, the elevator shown actuated to the full up position in solid lines from its neutral position shown in broken lines;

FIG. 2 is a schematic view of the invention with the aircraft illustrated in a nose heavy condition, the elevator again being shown freely actuated to full up position as illustrated by movement of the elevator from the broken line position to the solid line position; and FIG. 3 is a schematic view of the invention with the aircraft in a tail heavy precarious condition wherein full upward movement of the elevator is limited as shown by the solid line position thereof.

The invention disclosed herein is not limited in its application to the method and details of construction and arrangement of parts shown and described, since the invention is capable of other embodiments and of being practiced or carried out in various other ways. Also it is to be understood that the phraseology or terminology employed herein is for the purpose of description and not of limitation.

The new method of the invention for preventing detrimental complete stalls such as in a slow flying tail heavy aircraft as during landings is to limit upward movement of the elevator only when the aircraft center of gravity is aft of its normal position. At least one embodiment for carrying out this new method is disclosed hereinafter.

FIG. 1 shows a conventional horizontal stabilizer 10 pivotally mounted with pivot 11 on fixed structure 12 of the tail of an aircraft. An elevator 13 is pivotally mounted in the usual manner with pivot 14 on the stabilizer 10. While various linkages may be utilized, the preferred linkage comprises a first link 15 pivotally connected with connection 16 to the stabilizer 10 forward of the stabilizer pivotal connection 11. A second link 17 is pivotally connected with connection 18 to fixed structure 19 of the aircraft tail. The free ends of links 15 and 17 are pivotally interconnected with connection 20. Fixedly secured to second link 17 is a protuberance or stop 21 of a length just short of contacting the forward end or extension 22 of elevator 13 when the elevator is in the full up position on the stabilizer which is trimmed for normal position of the center of gravity.

Suitable linkage is connected between the pilot's cockpit and the horizontal stabilizer for pitch trim thereof. Such stabilizer control linkage is illustrated by link 23 fixed to stabilizer 10 and link 24 pivotally connected between link 23 and a suitable trim control lever or wheel (not shown) in the cockpit. Accordingly the stabilizer may be adjusted from the normal position shown in FIG. 1 to trim out any pitch moments in the aircraft due to either a nose heavy or a tail heavy condition by horizontal push-or-pull actuation of link 24 to adjust the stabilizer to trim for a nose heavy aircraft as illustrated in FIG. 2, or to adjust the stabilizer as illustrated in FIG. 3 to trim for a tail heavy aircraft. Normally on the conventional aircraft, the amount of up horizontal stabilizer adjustment required varies inversely with the speed of the aircraft.

FIG. 2 illustrates the mechanism of FIG. 1, wherein the horizontal stabilizer 10 is illustrated as being trimmed for a nose heavy or forward center of gravity position for slow flight. Like the unlimited positioning of the elevator shown in FIG. 1, the elevator forward end 22 still remains free of the stop 21 and is not limited thereby with full upward movement of the elevator due to the downward actuation of the links and stop, 15, 17, and 21 respectively, by the downward tilt or adjustment of the stabilizer 10.

In FIG. 3 is illustrated the mechanism of FIG. 1 whereIn the horizontal stabilizer 10 is adjusted for a tail heavy or aft center of gravity aircraft flying at slow speed, as during landings. With the raising of the linkage and stop, 15, 17, and 21, respectively, attendant with upward adjustment of the horizontal stabilizer 10, the result is a limitation on the upward movement of the elevator as elevator forward end 22 contacts the raised stop 21.

Accordingly a new method and at least one embodiment for carrying out the method has been disclosed for preventing the detrimental complete stall of an aircraft while flying at slow speed in a tail heavy condition. The method comprises trimming or moving the stabilizer to neutralize any pitching moments due to the aft positioned center of gravity or movement of the center-of-gravity from forward to aft positions, and limiting upward movement of the elevator with the stabilizer to less than normal full upward movement i.e., in proportion to the stabilizer movement.

A feature of importance is that a fully stalled wing is detrimental to any aircraft, and particularly to an aircraft having the engine air intake located for consuming air off the top surface of the wing.

While more than one embodiment may perform the foregoing method, at least one embodiment is disclosed herein comprising a linkage responsive to the position of the horizontal stabilizer for varying the position of a stop for limiting movement of the elevator only when the stabilizer is adjusted for a rearward positioned center of gravity in an aircraft flying at slow speeds as for landings.

While only one embodiment of the invention has been shown in the accompanying drawing, it will be evident that various modifications are possible in the arrangement and construction of the disclosed aircraft elevator with deep stall preventing means without departing from the scope of the invention.

I claim:

1. For use in an aircraft having a center of gravity, the combination comprising,
   (a) a stabilizer, said stabilizer being moveably mounted on the aircraft and adapted to be moved with changes of the aircraft center of gravity location from a normal position for trimming the aircraft in pitch,
   (b) an elevator, said elevator being moveably mounted on said stabilizer for movement through a substantial distance both above and below a neutral position,
   (c) elevator limiting means, said elevator limiting means being responsive to said stabilizer for controlling said elevator by limiting upward movement of said elevator to a lesser amount than said distance above said neutral position when the aircraft center of gravity is aft of the normal position of the center of gravity, and
   (d) said elevator limiting means providing unlimited downward movement of said elevator through said distance below said neutral position simultaneously with the above limiting of elevator upward movement.

2. In an aircraft having a center of gravity, the combination comprising,
   (a) stabilizer means, said stabilizer means being moveable with changes of aircraft center of gravity location for trimming the aircraft in pitch,
   (b) elevator means, said elevator means comprising a control surface moveably mounted on said stabilizer means, and
   (c) elevator limiting means, said elevator limiting means comprising stop means on said stabilizer means and a rigid extension fixed to said control surface for contacting said stop means, said elevator limiting means being responsive to said stabilizer means for controlling said elevator.

3. In an aircraft having a center of gravity, the combination comprising, (a) stabilizer means, said stabilizer means being moveable with changes of aircraft center of gravity location for trimming the aircraft in pitch, (b) an elevator, said elevator being connected to said stabilizer means, (c) elevator limiting means, said elevator limiting means comprising a first link pivotally connected to said stabilizer means, a second link pivotally connected between said first link and a fixed point on the aircraft, and (d) a projection fixed to said second pivotal link for contacting and limiting the movement of said elevator.

4. In an aircraft having a center of gravity, the combination, comprising, (a) a stabilizer, a connection for pivotally mounting said stabilizer on said aircraft, said stabilizer being adjustable to be moved with changes of aircraft center of gravity location for maintaining the aircraft in trimmed attitude, (b) an elevator, said elevator being pivotally mounted on said stabilizer aft of said stabilizer pivotal mounting connection, and (c) elevator limiting means, said elevator limiting means comprising, (d) a first link pivotally connected to said elevator, (e) a second link pivotally connected between said first link and a fixed point on the aircraft, and (f) a projection fixed to said second link for contacting and limiting the movement of said elevator.

5. An aircraft having a center of gravity comprising the combination of, (a) a stabilizer adapted to be moveably mounted on the aircraft, (b) pilot operated means for moving said stabilizer with changes of aircraft center of gravity location for trimming the aircraft, (c) an elevator, said elevator being moveably mounted on said stabilizer for movement through a substantial distance both above and below a neutral position, and (d) elevator limiting means, said elevator limiting means being responsive to said pilot operated means for controlling said elevator by limiting upward movement of said elevator to a lesser amount than said distance above said neutral position and simultaneously providing unlimited downward movement of said elevator through all of said distance below said neutral position.

6. An aircraft having a center of gravity comprising the combination of, (a) a stabilizer moveably mounted on the aircraft and adapted to be moved with changes of aircraft center of gravity location for trimming the aircraft, (b) an elevator, said elevator being moveably mounted on said stabilizer, and (c) elevator stop means, said elevator stop means being responsive to the location of the aircraft center of gravity for controlling said elevator, said elevator stop means comprising linkage means connected to said stabilizer, a protuberance on said linkage means, and a rigid extension fixed to said elevator for contacting said protuberance.

7. In an aircraft having an elevator moveably mounted on a movable stabilizer and having free full upward movement of the elevator with both center positioned center-of-gravity and forwardly positioned center-of-gravity, the method for preventing complete stall of the aircraft with the center of gravity positioned aft comprising, (a) moving the stabilizer to neutralize the aircraft pitching moment due to movement of the center of gravity from forward to aft positions, (b) with the center-of-gravity positioned aft providing full and unlimited downward movement of said elevator, and (c) with the center-of-gravity positioned aft simultaneously limiting the upward movement of the elevator in proportion to said stabilizer movement.

References Cited in the file of this patent

UNITED STATES PATENTS

| | | |
|---|---|---|
| 1,832,159 | Vanderlip | Nov. 17, 1931 |
| 1,848,037 | Weick | Mar. 1, 1932 |
| 2,104,006 | Ballou | Jan. 4, 1938 |
| 2,173,767 | Read | Sept. 19, 1939 |
| 2,313,800 | Burroughs | Mar. 16, 1943 |
| 2,400,017 | Miles | May 7, 1946 |
| 2,416,958 | Sears | Mar. 4, 1947 |
| 2,516,142 | Nissen | July 25, 1950 |
| 2,685,422 | Hammond et al. | Aug. 3, 1954 |
| 2,743,618 | Watson et al. | May 1, 1956 |
| 2,756,951 | Hanson et al. | July 31, 1956 |
| 2,923,499 | Dinard | Feb. 2, 1960 |

FOREIGN PATENTS

| | | |
|---|---|---|
| 280,406 | Great Britain | Nov. 17, 1927 |